(12) United States Patent
Ryan et al.

(10) Patent No.: US 7,802,809 B2
(45) Date of Patent: Sep. 28, 2010

(54) OCCUPANT PROTECTION SYSTEM

(75) Inventors: Sean Timothy Ryan, Farmington Hills, MI (US); Manoharprasad K. Rao, Novi, MI (US); Jerry R. Brown, Northville, MI (US); Richard Edward Ruthinowski, Taylor, MI (US); Brian Robert Spahn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

(21) Appl. No.: 12/241,669

(22) Filed: Sep. 30, 2008

(65) Prior Publication Data

US 2010/0078921 A1   Apr. 1, 2010

(51) Int. Cl.
*B60R 21/207* (2006.01)
*B60R 21/213* (2006.01)
*B60R 21/231* (2006.01)

(52) U.S. Cl. .................................. 280/730.2; 280/730.1
(58) Field of Classification Search .............. 280/730.1, 280/730.2; B60R 21/207, 21/213, 21/231
See application file for complete search history.

(56) References Cited

U.S. PATENT DOCUMENTS

| | | | | |
|---|---|---|---|---|
| 2,834,606 | A * | 5/1958 | Bertrand | 280/730.1 |
| 5,251,931 | A | 10/1993 | Semchena et al. | |
| 5,277,441 | A | 1/1994 | Sinnhuber | |
| 5,333,899 | A | 8/1994 | Witte | |
| 5,485,758 | A | 1/1996 | Brown et al. | |
| 5,492,361 | A * | 2/1996 | Kim | 280/730.1 |
| 5,536,038 | A | 7/1996 | Bollaert et al. | |
| 5,542,696 | A * | 8/1996 | Steffens et al. | 280/730.2 |
| 5,564,736 | A | 10/1996 | Kim | |
| 5,630,616 | A | 5/1997 | McPherson | |
| 5,678,852 | A * | 10/1997 | Brown et al. | 280/730.2 |
| 6,302,436 | B1 | 10/2001 | Eyrainer | |
| 6,406,057 | B1 | 6/2002 | Fischer | |
| 6,755,273 | B2 * | 6/2004 | Breed | 180/274 |
| 6,896,325 | B2 | 5/2005 | Takedomi et al. | |
| 7,455,314 | B2 * | 11/2008 | Ryan et al. | 280/729 |
| 2004/0232666 | A1 | 11/2004 | Sato et al. | |
| 2005/0082797 | A1 | 4/2005 | Welford et al. | |
| 2006/0196715 | A1 | 9/2006 | Fujishiro et al. | |
| 2007/0102905 | A1 | 5/2007 | Ryan et al. | |
| 2008/0296876 | A1 * | 12/2008 | Ideue | 280/730.2 |

* cited by examiner

*Primary Examiner*—Paul N Dickson
*Assistant Examiner*—Laura Freedman
(74) *Attorney, Agent, or Firm*—Frank A. MacKenzie; Brooks Kushman P.C.

(57) ABSTRACT

System and method for protecting an occupant in a vehicle seat, through the use of an occupant protection system is disclosed, wherein the vehicle seat includes a backrest section and a seat section. The occupant protection system includes a first airbag assembly having a first inflatable airbag, wherein the first airbag assembly is containable within an airbag recess located within a vehicle roof portion. A second airbag assembly is included having a second inflatable airbag and a deployment location. The second airbag assembly is mounted to a frame that is integrated with the seat while being external to a seat cushion. The first inflatable airbag is configured to extend downward from the roof portion to below a passenger shoulder-thorax protection region while in an inflated state. The second inflatable airbag is configured to extend upward from the deployment location through a passenger pelvic-thorax protection region while in an inflated state.

20 Claims, 5 Drawing Sheets

OCCUPANT PROTECTION SYSTEM

TECHNICAL FIELD

The present invention relates to a system and method for protecting an occupant within a vehicle.

BACKGROUND

Conventional occupant protection systems include an inflatable restraint, such as an airbag that inflates when the vehicle experiences a collision or roll-over event. When the airbag is in the inflated state, it extends into the vehicle occupant compartment at a location adjacent to an occupant of the vehicle. In certain collisions or roll-over events, a curtain airbag, a seatback-mounted side airbag, and/or a seat cushion-mounted side airbag may be deployed for occupant protection. Although these conventional occupant protection systems help reduce injury to vehicle occupants, there exists a wide horizon for improvement. It is recognized that the coordination of the deployment and inflation of airbags in conventional systems is both cumbersome and inefficient. Additionally, there exists opportunity to improve upon conventional occupant protection systems to provide increased occupant coverage in a cost-effective and efficient manner.

The present invention was conceived in view of these and other disadvantages of conventional occupant protection systems.

SUMMARY

A system and method for protecting an occupant is disclosed. The occupant protection system is for a vehicle having a roof portion, wherein the roof portion includes at least one airbag recess. The system includes at least one occupant seat having a frame integrated with a backrest section and a seat section. The seat section includes a seat cushion. A first airbag assembly is included having a first inflatable airbag, wherein the first airbag assembly is containable within the airbag recess of the roof portion. A second airbag assembly is disclosed having a second inflatable airbag and a deployment location. The second airbag assembly is mounted to the frame that is integrated with the seat section and is external to the seat cushion. The first inflatable airbag is configured to extend downward from the roof portion to below a passenger shoulder-thorax protection region while in an inflated state. The second inflatable airbag is configured to extend upward from the seat section through a passenger pelvic-thorax protection region while in an inflated state.

The method of protecting occupants within a vehicle is disclosed wherein the vehicle includes a roof portion having at least one airbag recess. The vehicle also includes at least one occupant seat having a frame integrated with a backrest section and a seat section. Additionally, the seat section includes a seat cushion.

The method includes providing an occupant protection system having a first airbag assembly that includes a first inflatable airbag. The first airbag assembly is containable within the airbag recess of the roof portion. The occupant protection system also includes a second airbag assembly having a second inflatable airbag and a deployment location. The second airbag assembly is mounted to the frame that is integrated with the seat section. The second airbag assembly may be mounted to the frame while being external to the seat cushion.

The method includes sensing the occurrence of a vehicular condition. The method also includes deploying the first airbag upon sensing the vehicular condition, thereby causing inflation of the first airbag. The first airbag then extends downward from the roof portion through a passenger shoulder-thorax protection region while in an inflated state. The method also includes deploying the second airbag upon sensing the vehicular condition, thereby causing inflation of the second airbag. The inflated second airbag then extends upward from the seat section through a passenger pelvic-thorax protection region while in an inflated state. Depending upon the vehicular condition, the first bag or the second bag may be deployed in any order or simultaneously.

The above embodiments and other embodiments, features and advantages of the present invention are readily apparent from the following detailed description of the best mode for carrying out the invention when taken in connection with the accompanying drawings.

BRIEF DESCRIPTION OF THE DRAWINGS

The features of the present invention are set forth with particularity in the appended claims. The present invention, both as to its organization and manner of operation, together with further objectives and advantages thereof, may be best understood with reference to the following description, taken in connection with the accompanying drawings in which:

DETAILED DESCRIPTION OF AN EMBODIMENT

By way of example, a system and method for implementing the present invention is described below. The system and methodology may be adapted, modified or rearranged to best fit a particular implementation without departing from the scope of the present invention.

Figure 1:
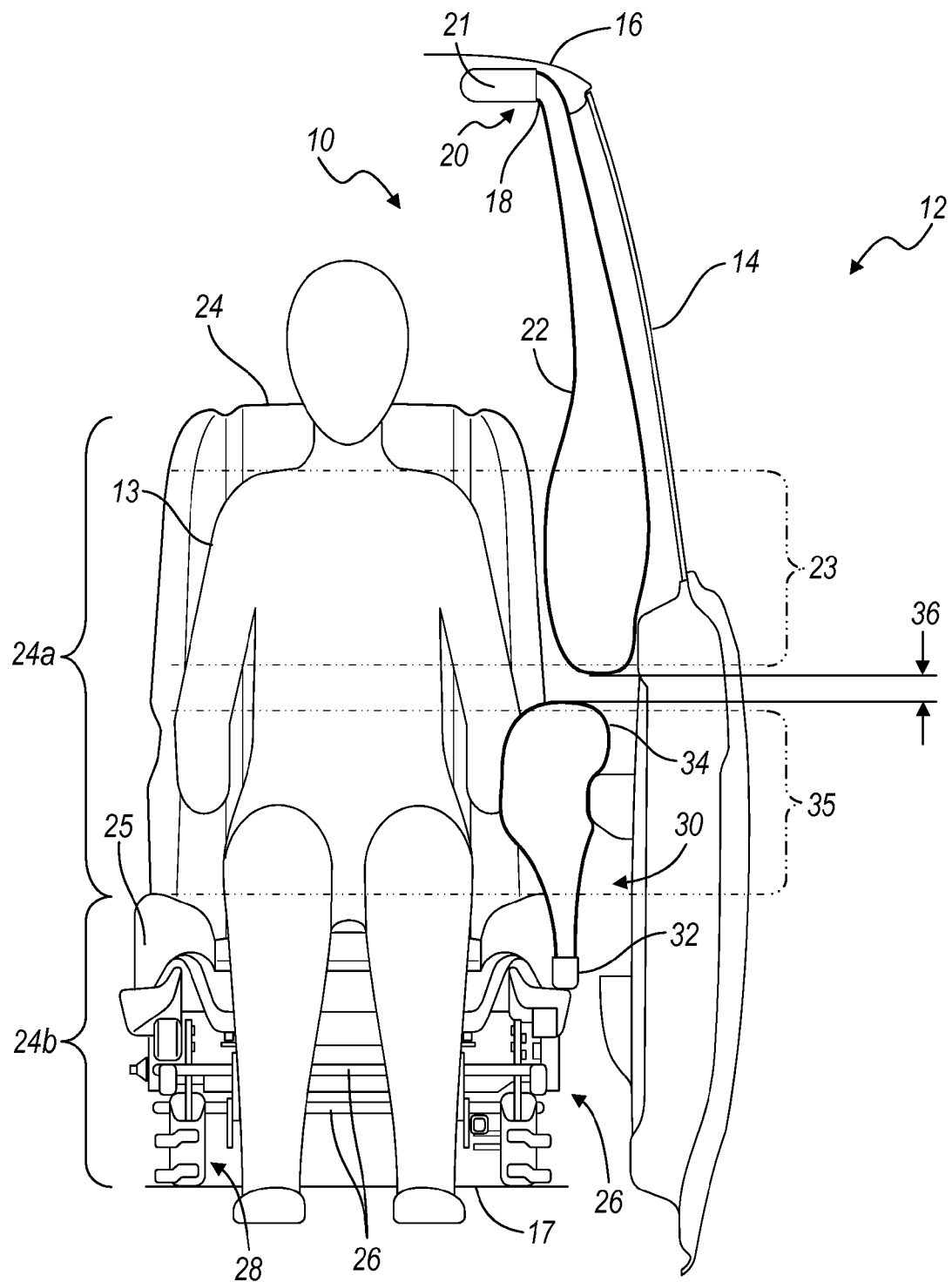
FIG. 1 illustrates a vehicle having an occupant protection system in accordance with an embodiment of the present invention.

Referring to FIG. 1, a vehicle 12 is illustrated having an occupant protection system 10. Vehicle 12 includes a door 14 that is operatively connected to a roof 16 and a floor 17. Roof 16 includes a recess or opening 18 for placement of an airbag assembly 20. Accordingly, occupant protection system 10 includes airbag assembly 20 having an airbag 22, a seat 24 and an airbag assembly 30 having an airbag 34. Seat 24 includes a backrest section 24a and a seat section 24b. A frame 26 may be integrated with backrest section 24a and seat section 24b. Additionally, frame 26 includes a seat track 28 that enables movement of seat 24 and mounting of seat 24 to floor 17. It is recognized that frame 26 may include any rigid body capable of securing and stabilizing seat 24 to floor 17. As such, frame 26 may also extend external to seat section 24b in a manner that enables mounting of air bag assembly 32. Furthermore, as recognized by one of ordinary skill in the art, occupant protection system 10 includes multiple sensors (not shown) that are configured to sense the occurrence of a vehicular condition, such as a side-impact or roll-over event.

As described above, airbag assembly 30 includes an airbag module 32 and an airbag 34. In the event of a vehicular condition, such as a side impact collision, airbags 22 and 34 may be deployed in a manner that minimizes any physical impact and injury experienced by an occupant 13. For example, in the event of a side collision with door 14, airbag 34 is deployed and inflated so as to provide a barrier between door 14 and occupant 13. Additionally, airbag 22, while in a deployed and inflated state, protects occupant 13 from colliding with upper portions of door 14. Accordingly, as shown, airbag 22 is configured to extend downward from roof 16 through a shoulder-thorax protection region 23, thereby providing coverage for the head, neck, shoulder and thorax areas of occupant 13. Furthermore, airbag 34, while in a deployed and inflated state, is configured to extend upward from seat section 24b through a pelvic-thorax protection region 35. As such, the pelvic, mid-abdominal and thorax areas of occupant 13 are protected from impact.

In one embodiment, an air gap 36 exists between airbags 22 and 34. In one aspect of the present invention, air gap 36 may have a length of up to 6 inches. In alternative embodiments, it is recognized that airbag 22 may physically contact airbag 34 while both are in the deployed and inflated state, thereby eliminating air gap 36. As described in the foregoing, airbag assemblies 20 and 30 include modules 21 and 32, respectively. Modules 21 and 32 each include an inflator that enables inflation of airbags 22 and 34 upon sensing of a vehicle condition. The inflators are capable of supplying gas to air bags 22 and 34 thereby causing inflation of airbags 22 and 34.

Airbag 22 may inflate at a lower pressure than airbag 34. This can protect the head region and load the shoulder of an occupant. Correspondingly, airbag 34 may inflate at a higher pressure than airbag 22. As a result, the pelvic region may be primarily loaded pushing the occupant away from an intruding door upon impact, thereby enhancing the capability of airbag 22 to be deployed into position and fill the gap between the occupant and the vehicle side for improved protection.

Referring to FIGS. 2A-2D, multiple embodiments are shown of airbag assembly 30 being mounted to seat 24. As illustrated, airbag assembly 30 may have various orientations with respect to seat track 28. It is recognized that the orientation of airbag assembly 30 may vary depending on the seat design and/or performance requirements of occupant protection system 10. Airbag assembly 30 also includes a deployment location 30b that is an area of airbag assembly 30 from which airbag 34 (FIG. 1) is deployed. For illustration purposes, deployment location 30b includes a darker shaded line drawn normal to deployment location 30b. Depending upon the orientation of airbag assembly 30 (specifically deployment location 30b), the particular coverage for the occupant may vary. In one embodiment, airbag assembly 30 may be mounted to the frame of seat 24 in a manner that enables optimal coverage for the occupant, despite movement or repositioning of seat 24 along seat track 28. Additionally, as shown, airbag assembly 30, which is mounted to frame 26 may be external to cushion 25, and may have a deployment location integral with a trim panel 38.

Figure 2A:
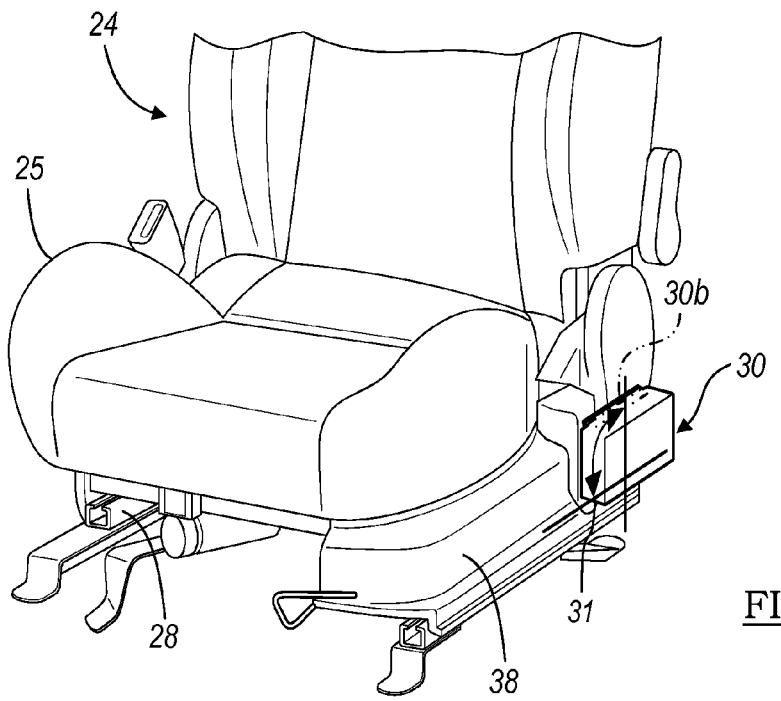
FIGS. 2A-2D illustrate multiple views of an airbag assembly being mounted to a vehicle seat in accordance with embodiments of the present invention.
Figure 2B:
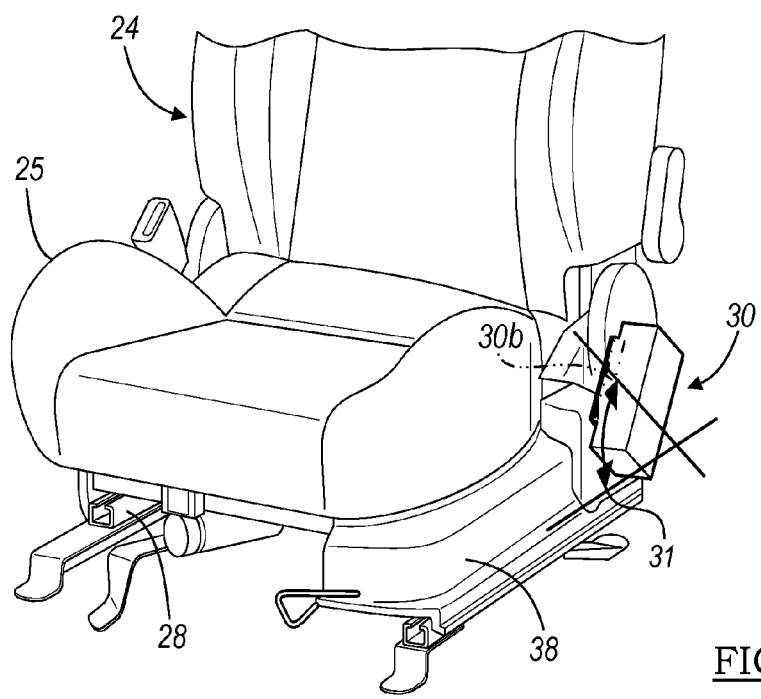
Figure 2C:
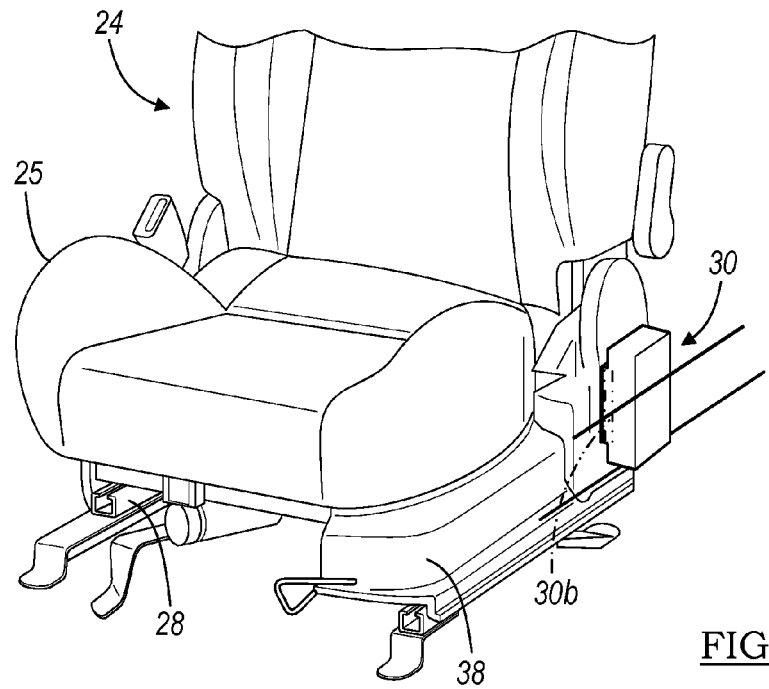
Figure 2D:
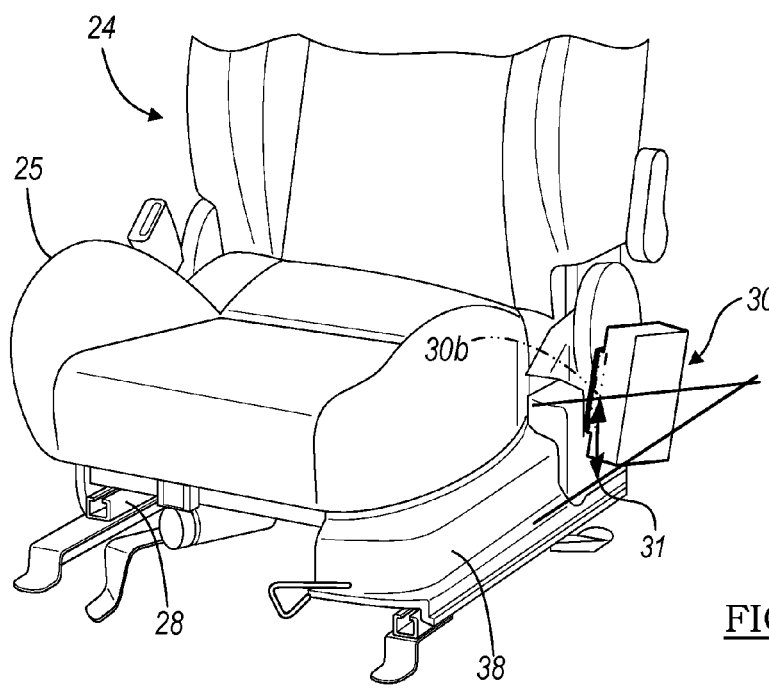

As described above, deployment location 30b of airbag assembly 30 may have an orientation that varies in reference to seat track 28. In one aspect of the present invention, the airbag assembly 30 may be mounted to the frame such that the angle measured between seat track 28 and the deployment location 30b (or the line drawn normal to the deployment location 30b) ranges from 0 degrees to 120 degrees. Referring specifically to FIG. 2A, an embodiment is shown wherein the airbag module is oriented such that an angle 31 measured between seat track 28 and the line drawn normal to the deployment location 30b is about 90 degrees. FIG. 2B illustrates an additional embodiment wherein the airbag module is oriented such that the angle 31 measured between seat track 28 and the line drawn normal to the deployment location 30b is about 65 degrees. FIG. 2C illustrates another embodiment wherein the airbag module is oriented such that the angle measured between seat track 28 and the line drawn normal to the deployment location 30b (which is parallel to the seat track 28) is 0 degrees. FIG. 2D illustrates yet another embodiment wherein the airbag module is oriented such that the angle 31 measured between seat track 28 and a line drawn normal to the deployment location 30b is about 30 degrees. It is recognized that both the mounting location on the frame and orientation of airbag assembly 30 may vary from the illustrated embodiments without departing from the scope of the present invention.

Figure 3A:
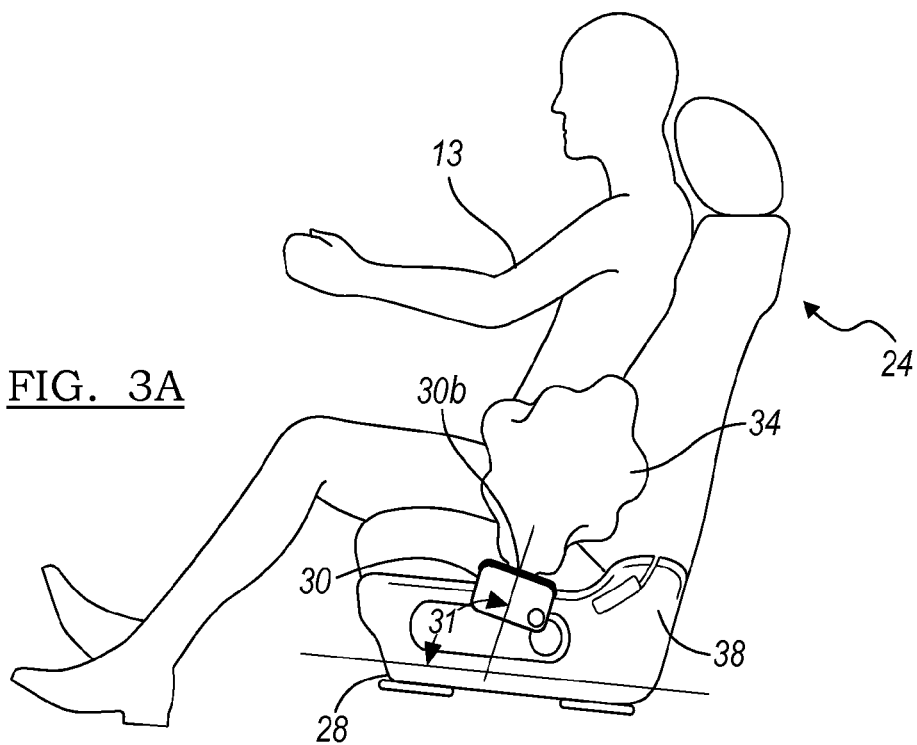
FIGS. 3A and 3B illustrate multiple views of an airbag assembly at various orientations having deployed airbags in accordance with an embodiment of the present invention.
Figure 3B:
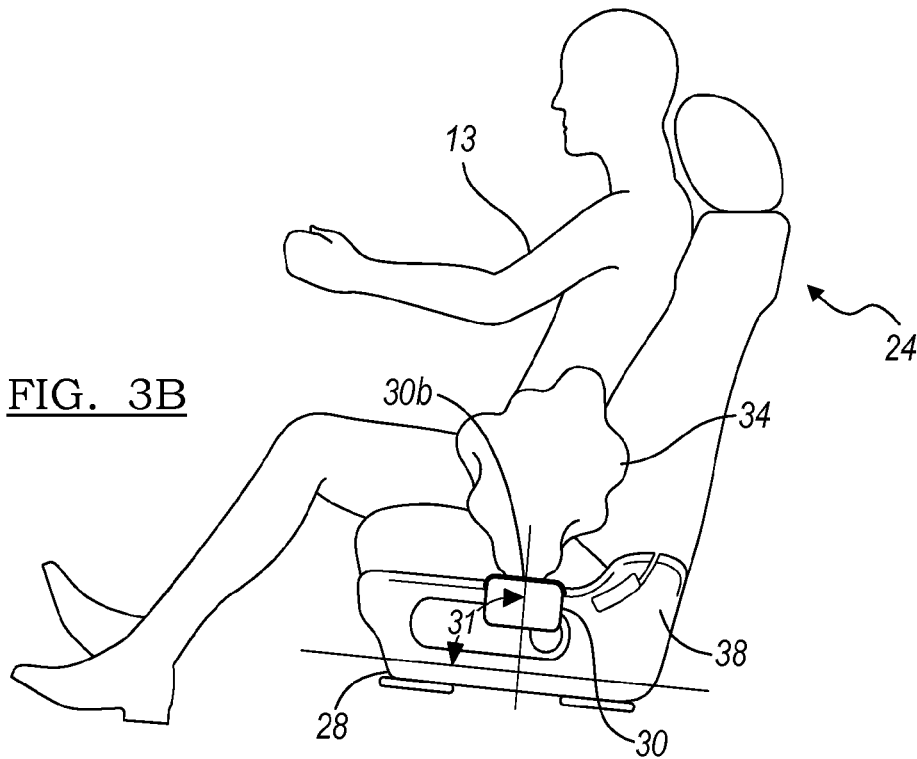

Referring to FIGS. 3A and 3B, additional embodiments are shown wherein airbag 34 is in a deployed and inflated state. Specifically, referring to FIG. 3A, the airbag module is oriented such that the angle 31 measured between seat track 28 and the line drawn normal to the deployment location 30b is about 100 degrees. Referring to FIG. 3B specifically, the airbag module is oriented such that angle 31 measured between seat track 28 and the line drawn normal to the deployment location 30b is about 90 degrees. Now referring to FIGS. 3A and 3B, the coverage for occupant 13 may be adapted to provide optimal protection as illustrated by the deployed and inflated airbags 34.

Figure 4A:
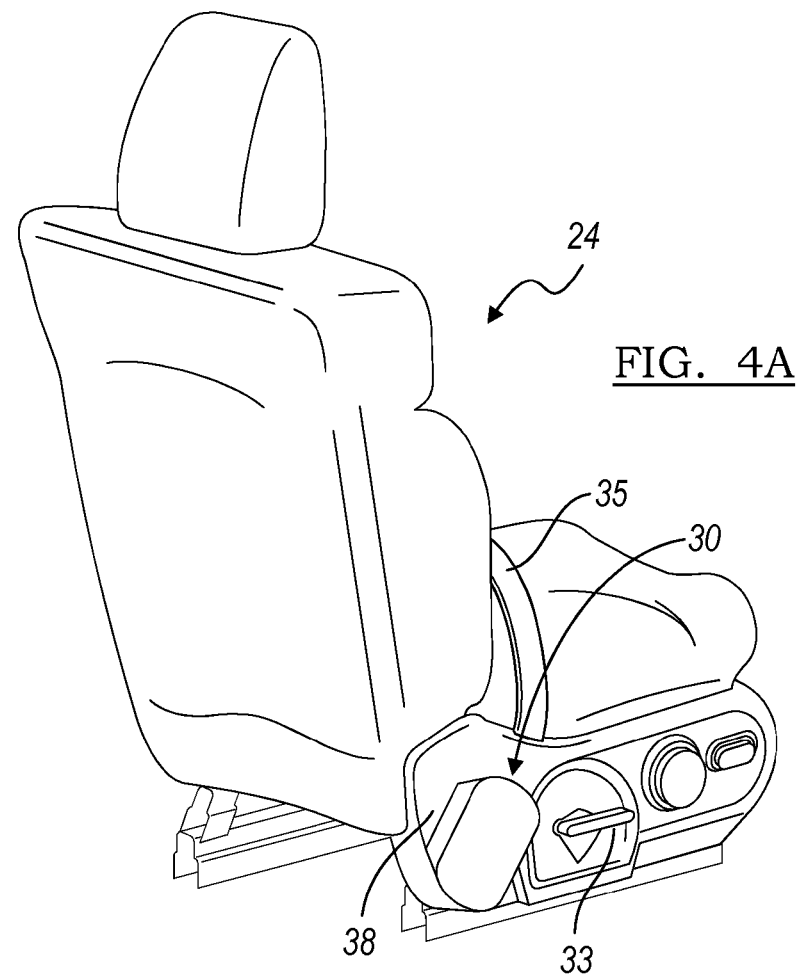
FIGS. 4A and 4B illustrate a vehicle seat having an airbag assembly in accordance with an embodiment of the present invention.
Figure 4B:
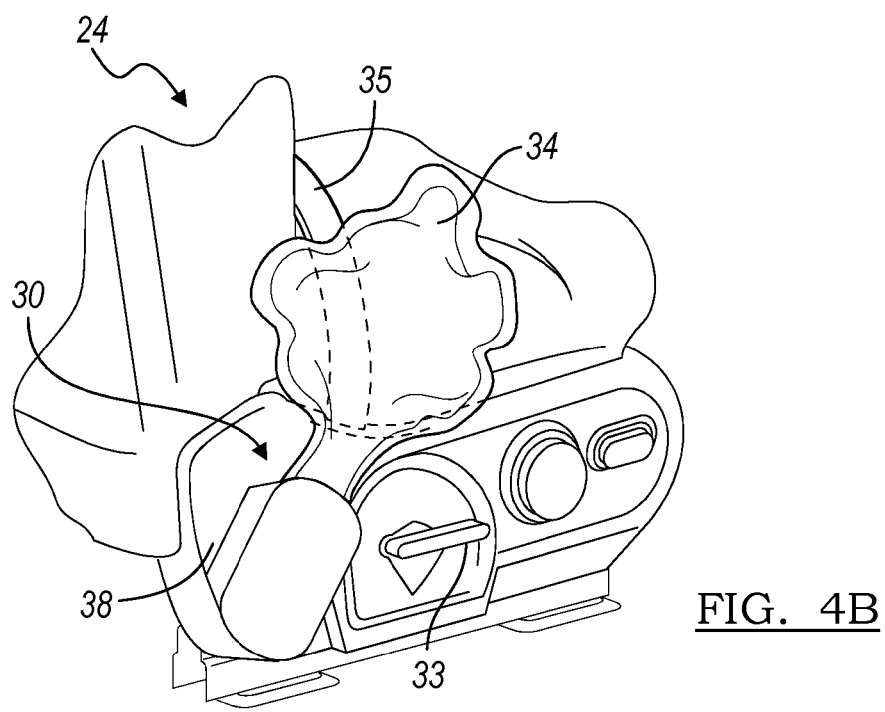

Referring to FIGS. 4A and 4B, an embodiment is shown wherein airbag assembly 30 is enclosed within trim panel 38. Accordingly, trim panel 38 is attachable to the seat section of seat 24. As such, upon deployment and inflation of the airbag, trim panel 38 may detach, open, and/or separate from the seat section. The variations described in attaching the airbag assembly 30, in terms of location, orientation and packaging enables it to be deployed without interference with both seat mounted and vehicle body mounted seatbelt systems. The embodiments shown enable the airbag to deploy and inflate without interference from a seatbelt 35, a reclining lever 33 or other seat controls. FIG. 4B illustrates yet another example wherein airbag 34 is in an inflated state after being deployed, thereby providing protection for the pelvic-thorax region of the occupant.

While the best mode for carrying out the invention has been described in detail, those familiar with the art to which this invention relates will recognize various alternative designs and embodiments for practicing the invention as defined by the following claims.

What is claimed:

1. An occupant protection system for a vehicle having a roof portion, wherein the roof portion includes at least one airbag recess, the system comprising:

at least one occupant seat having a frame integrated with a backrest section and a seat section, wherein the seat section includes a seat cushion, a first airbag assembly having a first inflatable airbag, the first airbag assembly being containable within the airbag recess;

a second airbag assembly having a second inflatable airbag and a deployment location, the second airbag assembly being mounted to the frame that is integrated with the seat section, the frame being external to the seat cushion; and the first inflatable airbag being configured to extend downward from the roof portion to below a passenger shoulder-thorax protection region while in an inflated state, and the second inflatable airbag being configured to extend upward from the deployment location through a passenger pelvic-thorax protection region while in an inflated state, wherein the first inflatable airbag is operable to inflate at a lower pressure than the second inflatable airbag thereby loading the pelvic-thorax region and pushing a passenger away from a vehicle door.

2. The system of claim 1, wherein the frame includes a seat track for mounting the seat to a vehicle floor, the second airbag assembly being mounted to the frame and having an angle in the range of 0° and 120° between a line that is normal to the deployment location and the seat track.

3. The system of claim 1, wherein the first airbag assembly includes an airbag module having an inflator adapted to cause inflation of the first airbag at a lower volumetric pressure than the second airbag.

4. The system of claim 1, wherein the second airbag assembly includes an airbag module having an inflator adapted to cause inflation of the second airbag at a higher volumetric pressure than the first airbag.

5. The system of claim 1, further including a trim panel that is attachable to the seat section to substantially enclose the second airbag assembly having the second airbag.

6. The system of claim 1, wherein the second airbag assembly and the first airbag assembly are deployed sequentially.

7. The system of claim 1, wherein an air gap exists between the first inflatable airbag and the second inflatable airbag while in the inflated state.

8. An occupant protection system for a vehicle having a roof portion, wherein the roof portion includes at least one airbag recess, the system comprising:
at least one occupant seat having a frame integrated with a backrest section and a seat section, the seat section including a seat cushion;
a first airbag assembly having a first inflatable airbag, the first airbag assembly being containable within the airbag recess;
a second airbag assembly having a second inflatable airbag and a deployment location, the second airbag assembly being mounted to the frame that is integrated with the seat section, the frame being external to the seat cushion;
the first inflatable airbag being configured to extend downward from the roof portion to below a passenger shoulder-thorax protection region while in an inflated state, the second inflatable airbag being configured to extend upward from the airbag deployment location through a passenger pelvic-thorax protection region while in an inflated state, the first inflatable airbag is operable to inflate at a lower pressure than the second inflatable airbag thereby loading the pelvic-thorax region and pushing a passenger away from a vehicle door; and
wherein an air gap of up to 6 inches exists between the first inflatable airbag and the second inflatable airbag while in the inflated states.

9. The system of claim 8, wherein the frame includes a seat track for mounting the seat to a vehicle floor and wherein the second airbag assembly, having the deployment location, is mounted to the frame with an angle in the range of 0° and 120° between a line that is normal to the deployment location and the seat track.

10. The system of claim 8, wherein the first airbag assembly includes an airbag module having an inflator adapted to cause inflation of the first airbag at a lower volumetric pressure than the second airbag.

11. The system of claim 8, wherein the second airbag assembly includes an airbag module having an inflator adapted to cause inflation of the second airbag at a higher volumetric pressure than the first airbag.

12. The system of claim 8, further including a trim panel that is attachable to the seat section to substantially enclose the second airbag assembly having the second airbag.

13. The system of claim 8, wherein the second airbag assembly and the first airbag assembly are deployed sequentially.

14. The system of claim 13, wherein deployment of the second airbag assembly precedes deployment of the first airbag assembly.

15. A method of protecting occupants within a vehicle having a roof portion that includes at least one airbag recess, at least one occupant seat having a frame integrated with a backrest section and a seat section, wherein the seat section includes a seat cushion, the method comprising:
providing an occupant protection system including,
a first airbag assembly having a first inflatable airbag, the first airbag assembly being containable within the airbag recess,
a second airbag assembly having a second inflatable airbag and a deployment location, the second airbag assembly being mounted to the frame that is integrated with the seat section, the frame being external to the seat cushion;
sensing the occurrence of a vehicular condition;
deploying the first airbag, at a lower pressure than the second airbag, upon sensing the vehicular condition, thereby causing inflation of the first airbag, wherein the first airbag extends downward from the roof portion to below a passenger shoulder-thorax protection region while in an inflated state; and
deploying the second airbag, at a higher pressure than the first airbag, upon sensing the vehicular condition, thereby causing inflation of the second airbag, wherein the second airbag extends upward from the deployment location through a passenger pelvic-thorax protection region while in an inflated state.

16. The method according to claim 15, wherein the frame includes a seat track for mounting the seat to a vehicle floor and wherein the second airbag assembly is mounted to the frame having an angle in the range of 0° and 120° between a line that is normal to the airbag deployment location and the seat track.

17. The method according to claim 15, wherein providing an occupant protection system includes a trim panel that is attachable to the seat section to substantially enclose the second airbag assembly having the second airbag.

18. The method according to claim 15, wherein the second airbag assembly and the first airbag assembly are deployed sequentially.

19. The method according to claim 15, wherein an air gap exists between the first inflatable airbag and the second inflatable airbag while in the inflated state.

20. The method according to claim 15, wherein the first airbag assembly and the second airbag assembly include an airbag module having an inflator being adapted to cause inflation of the first airbag and the second airbag, respectively.

* * * * *